(12) United States Patent
Oliynyk

(10) Patent No.: US 12,125,016 B2
(45) Date of Patent: Oct. 22, 2024

(54) PEER-TO-PEER PAYMENT SYSTEMS AND METHODS

(71) Applicant: Capital One Services, LLC, McLean, VA (US)

(72) Inventor: Kyrylo Oliynyk, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 112 days.

(21) Appl. No.: 17/102,276

(22) Filed: Nov. 23, 2020

(65) Prior Publication Data

US 2021/0150506 A1 May 20, 2021

Related U.S. Application Data

(63) Continuation of application No. 15/872,683, filed on Jan. 16, 2018, now Pat. No. 10,846,679.

(51) Int. Cl.
*G06Q 20/10* (2012.01)
*G06Q 20/02* (2012.01)
(Continued)

(52) U.S. Cl.
CPC ........... *G06Q 20/223* (2013.01); *G06Q 20/02* (2013.01); *G06Q 20/10* (2013.01); *G06Q 20/322* (2013.01);
(Continued)

(58) Field of Classification Search
None
See application file for complete search history.

(56) References Cited

U.S. PATENT DOCUMENTS 6,157,920 A * 12/2000 Jakobsson ............ G06Q 50/188
705/64
6,195,698 B1 * 2/2001 Lillibridge ............. G06F 21/31
709/228
(Continued)

FOREIGN PATENT DOCUMENTS

EP 2779081 A1 9/2014
WO 20150145430 A1 10/2015
(Continued)

OTHER PUBLICATIONS

Office Action received in related EP Application No. 19152196.2, mailed Feb. 8, 2021 (10 pages).
(Continued)

*Primary Examiner* — William J Jacob
(74) *Attorney, Agent, or Firm* — TROUTMAN PEPPER HAMILTON SANDERS LLP; Christopher J. Forstner; John A. Morrissett

(57) ABSTRACT

A method including: receiving, from a sender, a group message directed toward the transfer facilitator and a recipient; identifying the sender and a payment account associated with the sender; parsing the group message to identify contact information for the recipient and instructions for a transfer request; contacting, using a private message and the parsed contact information, the recipient with instructions for receiving a payment from the sender; receiving, from the recipient, payment reception information including at least one of the recipient account or a payment method; and initiating, in accordance with the instructions for the transfer request, a fund transfer from the sender to the recipient from the identified payment account associated with the sender and the received payment reception information.

20 Claims, 7 Drawing Sheets

(51) Int. Cl.
*G06Q 20/22* (2012.01)
*G06Q 20/32* (2012.01)
*G06Q 20/40* (2012.01)
*G06N 3/04* (2023.01)

(52) U.S. Cl.
CPC ....... *G06Q 20/325* (2013.01); *G06Q 20/3255* (2013.01); *G06Q 20/4014* (2013.01); *G06N 3/04* (2013.01)

(56) References Cited

U.S. PATENT DOCUMENTS

| | | | |
|---|---|---|---|
| 6,934,845 B2* | 8/2005 | Carro | G06F 40/103 713/181 |
| 8,140,097 B2* | 3/2012 | Silk | G06Q 30/0212 455/410 |
| 8,662,384 B2 | 3/2014 | Dodin | |
| 8,700,729 B2* | 4/2014 | Dua | G06Q 20/40 705/64 |
| 9,342,831 B1* | 5/2016 | Davis | G06Q 20/40 |
| 9,430,787 B2* | 8/2016 | Dezelak | G06Q 30/0613 |
| 9,674,705 B2* | 6/2017 | Rose | H04W 12/033 |
| 9,785,934 B2* | 10/2017 | Davis | G06Q 20/10 |
| 2004/0254992 A1* | 12/2004 | Kiss | H04L 51/04 709/206 |
| 2007/0005955 A1* | 1/2007 | Pyle | H04L 9/3228 713/156 |
| 2007/0233615 A1* | 10/2007 | Tumminaro | H04L 63/08 705/75 |
| 2007/0255653 A1 | 11/2007 | Tumminaro et al. | |
| 2009/0070263 A1* | 3/2009 | Davis | G06Q 20/322 705/44 |
| 2009/0081949 A1* | 3/2009 | Silk | H04W 4/14 455/466 |
| 2009/0081989 A1* | 3/2009 | Wuhrer | H04M 15/55 455/406 |
| 2011/0022515 A1 | 1/2011 | Tallitsch et al. | |
| 2011/0184866 A1* | 7/2011 | Shakkarwar | G06Q 20/40 705/44 |
| 2011/0211759 A1* | 9/2011 | Park | G06V 30/182 382/182 |
| 2012/0246231 A1* | 9/2012 | Norena | G06Q 50/01 709/204 |
| 2013/0060678 A1 | 3/2013 | Oskolkov et al. | |
| 2013/0060679 A1* | 3/2013 | Oskolkov | G06Q 20/322 705/39 |
| 2013/0110662 A1* | 5/2013 | Dezelak | G06Q 30/0613 705/26.1 |
| 2013/0144738 A1 | 6/2013 | Qawami et al. | |
| 2014/0156435 A1* | 6/2014 | Rahman | G06Q 20/385 705/44 |
| 2015/0348002 A1 | 12/2015 | Van Os et al. | |
| 2016/0012465 A1* | 1/2016 | Sharp | G06Q 20/321 705/14.17 |
| 2016/0125368 A1 | 5/2016 | Grassadonia et al. | |
| 2016/0125371 A1* | 5/2016 | Grassadonia | H04L 41/0293 705/44 |
| 2016/0224967 A1* | 8/2016 | Davis | G06Q 20/40 |
| 2016/0316367 A1* | 10/2016 | Rose | H04B 5/77 |
| 2017/0169508 A1* | 6/2017 | Song | G06Q 20/223 |
| 2017/0221032 A1 | 8/2017 | Mazed | |
| 2018/0005215 A1 | 1/2018 | Delaney et al. | |

FOREIGN PATENT DOCUMENTS

WO 2017015231 A1 1/2017
WO 2017072589 A2 5/2017

OTHER PUBLICATIONS

Extended European Search Report in related EP Application No. 19152196.2, mailed Jun. 4, 2019.

* cited by examiner

PEER-TO-PEER PAYMENT SYSTEMS AND METHODS

CROSS REFERENCE TO RELATED APPLICATIONS

This application is a continuation of, and claims priority under 35 U.S.C. § 120 to, U.S. patent application Ser. No. 15/872,683, filed Jan. 16, 2018, the entire contents of which are fully incorporated herein by reference.

FIELD

The present disclosure relates to peer-to-peer payment systems and methods, and more particularly to the use of group messaging in peer-to-peer payments.

BACKGROUND

With the decline in the use of physical money, electronic peer-to-peer payment systems have become increasingly relevant tool. However, related art systems require both the sender and the receiver to be registered on the same platform or have accounts with the same institution to process the payments. Such requirements may be cumbersome to users. For example, in order to send or receive money, the sender and receiver must coordinate to select a platform and exchange contact information (e.g., usernames) for that platform. If either the sender or receiver does not already have an account, they must set up the account which can include providing personal information and financial account information to an unknown third party.

Accordingly, there is needed a method and system for initiating financial transfers in a peer-to-peer manner that does not require the burdensome platform and coordination requirements. Embodiments of the present disclosure are directed to this and other considerations.

SUMMARY

Disclosed embodiments provide systems and methods using dual-stage neural network pipelines for detecting and recognizing specialized characters.

Consistent with the disclosed embodiments, various methods and systems are disclosed. In an embodiment, a method for initiating a peer-to-peer payment using group messaging is disclosed. The method may be implemented with a computing device. The method may include executing an application configured to initiate a peer-to-peer fund transfer request; receiving, by the application, an indication for a request to transfer money from a transferor to a recipient; receiving contact information for the recipient; generating, based on the received indication for the request and according to a text messaging protocol, a group message instructing the transfer of money from the transferor to the recipient, the group message being from the transferor and to the recipient and a transfer facilitator, the transfer facilitator being configured to facilitate the transfer of money; and transmitting the group message to the recipient and the transfer facilitator.

The method may include receiving the contact information for the recipient by: accessing, by the application, a list of one or more contacts of the transferor; receiving an indication of a user selection of a contact from the list of one or more contacts; and extracting contact information associated with the selected contact as the contact information for the recipient.

The method may further include transmitting, under the direction of the application, a verification message to the transfer facilitator indicating validity of the group message instructing the transfer of money.

The method may further include receiving, by the application, log-in credentials verifying the identity of the transferor, wherein the verification message verifies, to the transfer facilitator, the request to transfer money.

The method may further include inserting, into the group message, a verification code to validate an authenticity of the group message, wherein the verification message includes the verification code.

The method may further include receiving, by the application, the contact information for the recipient and a transfer amount.

The method may further include receiving, by the application, an indication of an instruction to transmit the transfer request; and automatically generating and transmitting the group message in response to receiving the indication to transmit the transfer request.

The method may further include receiving, by the application, an indication for request to transfer money from a transferor to a plurality of recipients, wherein the group message instructs the transfer of money from the transferor to the plurality of recipients, the group message being from the transferor and to the plurality of recipients and a transfer facilitator.

The method may further include receiving, from the transfer facilitator, a communication seeking confirmation of an interpretation of the transfer request generated by the transfer facilitator, the interpretation including an identification of the recipient and an amount to be transferred; and transmitting, in response to receiving an indication of a confirmation, a confirmation message to the transfer facilitator, the confirmation message indicating validation of the interpretation.

According to some embodiments, there is a provided a method of a transfer facilitator including: receiving, from a sender, a group message directed toward the transfer facilitator and a recipient; identifying the sender and a payment account associated with the sender; parsing the group message to identify contact information for the recipient and instructions for a transfer request; contacting, using a private message and the parsed contact information, the recipient with instructions for receiving a payment from the sender; receiving, from the recipient, payment reception information including at least one of a recipient account or a payment method; and initiating, in accordance with the instructions for the transfer request, a fund transfer from the sender to the recipient from the identified payment account associated with the sender and the received payment reception information.

In some cases, contacting the recipient with instructions for receiving a payment from the sender may include: generating, in response to receiving the group message, a dynamic webpage with fields for receiving the payment reception information; and transmitting, within the private message, a link to the generated dynamic webpage.

The method may further include deleting the dynamic webpage in response to either receiving the payment reception information or a timeout occurring.

The method may further include: receiving, from the recipient, image data of an image of an identification of the recipient; and analyzing the image data to confirm an identify of the recipient.

In some cases, receiving payment reception information may include: receiving, from the recipient, image data of an image of a check; and extracting account information from the image data as the payment reception information.

According to some implementations, the group message is directed toward the transfer facilitator and a plurality of recipients, and the method may further include: parsing the group message to identify contact information for each of the plurality of recipients; contacting, using a respective private message between the transfer facilitator and each of the plurality of recipients, each of the plurality of recipients with instructions for receiving a payment from the sender; receiving, from each of the plurality of recipients, respective payment reception information; and initiating, in accordance with the instructions for the transfer request, a fund transfer from the sender to each of the plurality of recipients using the identified payment account associated with the sender and the respective payment reception information.

According to some embodiments, the group message includes a header and body, the header includes contact information for each of the plurality of recipients, and the body includes names associated with respective transfer amounts corresponding to each of the plurality of recipients, and the method further includes: matching the names to the contact information; and initiating a fund transfer to each of the plurality of recipients includes initiating a fund transfer to each of the plurality of recipients to for the respective transfer amount corresponding to the respective recipient.

According to some embodiments, there is a provided a method including: implementing a conversational bot for facilitating transfer requests; receiving, from a sender, a telephony group message directed towards the conversational bot and a recipient, the group message including a funds transfer request from the sender to the recipient; parsing the group message to identify contact information of the recipient; outputting, to the recipient based on the identified contact information, a payment recovery message requesting information on delivering payment to the recipient, a body of the payment recovery message being determined by the conversational bot; receiving, from the recipient, payment reception information; and initiating, in accordance with the funds transfer request, a fund transfer from the sender to the recipient based on the payment reception information.

According to some embodiments, the telephony group message is directed towards the conversational bot and a plurality of recipients, a body of the group message includes a funds transfer request to transfer respective specified amounts to each of the recipients, and the method further includes analyzing, using the conversational bot, the body of the group message to determine an amount of money to be transferred to the respective recipients.

The method may further include identifying, from the group message, contact information of the sender; determining an identity of the sender based on the contact information; and determining a payment account associated with the sender for transferring funds to the recipient in accordance with the funds transfer request.

The method may further include determining an identity of the sender and determining a payment account by reference to a financial institution database.

Consistent with the disclosed embodiments, systems and non-transitory computer readable mediums for providing dual-stage neural network pipelines for detecting and recognizing specialized characters.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present disclosure is directed to methods and systems for peer-to-peer payments, and, in particular, for utilizing group messaging to initiate peer-to-peer payments. In one embodiment, a specialized application associated with a financial service provider is used to generate and transmit the group text message. A user may activate the application, indicate it would like to transfer funds, and provide funds instructions and contact information for a recipient. The application may generate a group text message based on the instructions and send the same to the recipient and a transfer facilitator.

In another embodiment, a system may include one or more memory devices storing instructions, and one or more processors configured to execute the instructions to perform steps of a method of initiating a peer-to-peer payment as disclosed herein.

In another embodiment, a non-transitory computer-readable medium is disclosed. The non-transitory computer-readable medium may store instructions that, when executed by one or more processors, cause a system to execute a method of generating a text message or facilitating a funds transfer.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
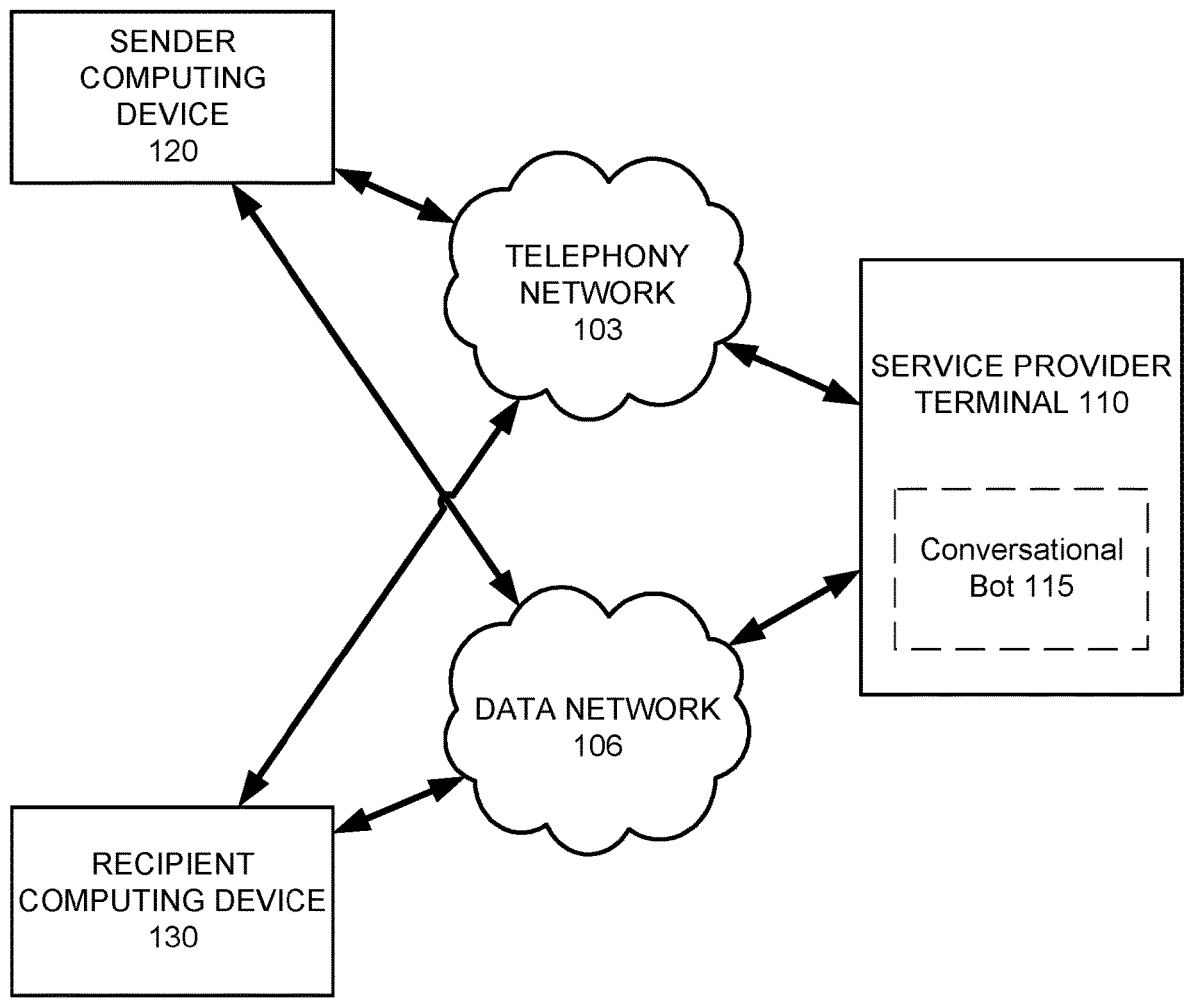
FIG. 1 is a diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system environment 100 may include a service provider terminal 110 in communication with a sender computing device 120 and a recipient computing device 130 via telephony network 103 and/or data network 106. In some embodiments, service provider terminal 110 may also be in communication with various databases (e.g., banking databases). Sender computing device 120 and recipient computing device 130 may be respective mobile computing devices (e.g., a smart phone, tablet computer, smart wearable device, portable laptop computer, voice command device, wearable augmented reality device, or other mobile computing device) or stationary devices (e.g., desktop computer).

In some embodiments, the sender computing device 120 may transmit a group message to the service provider terminal 110 and recipient computing device 130 authorizing a transfer of money to the user of the recipient computing device over telephony network 103. As discussed below in greater detail, the group message may be generated and/or sent using an application associated with a financial service provider. In response to receiving the group message, the service provider terminal 110 may communicate with recipient computing device 130 over the telephony network 103 and/or data network 106 to affect the money transfer. In some embodiments, the server provider terminal 110 may implement a conversational bot to interpret the group message from the sender computing device 120 and communicate with the recipient computing device 130

Figure 2:
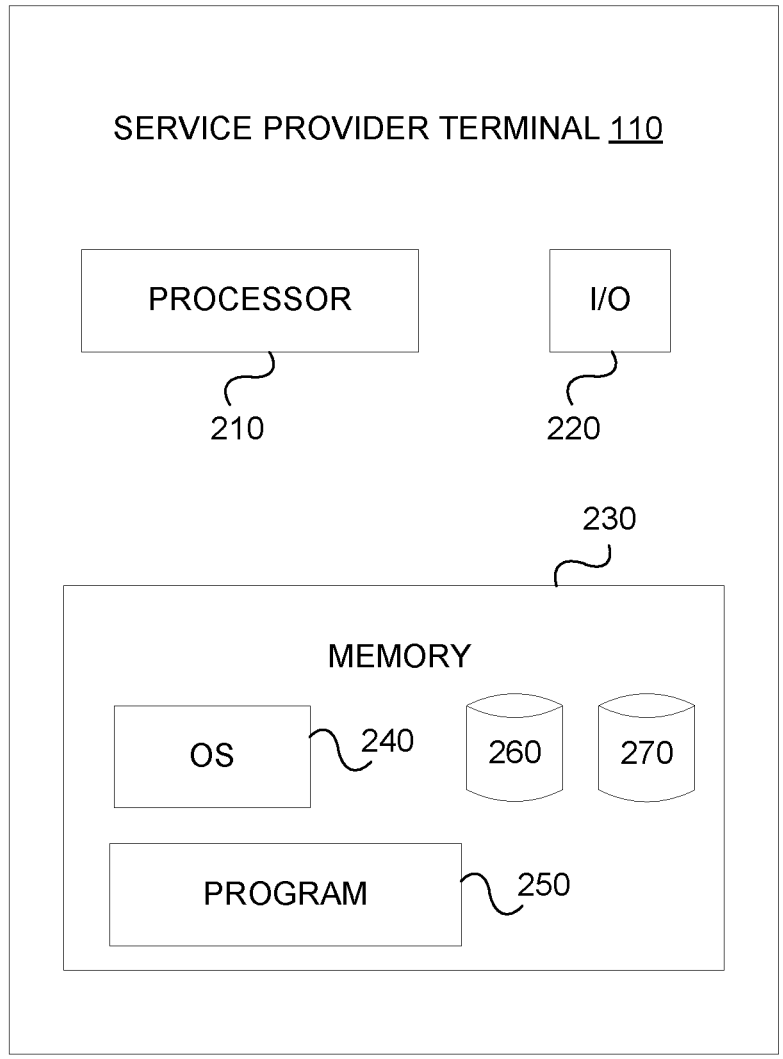
FIG. 2 is a component diagram of a service provider terminal according to an example embodiment.

Telephony network 103 may be any suitable network for exchanging group text messages. In some embodiments, telephony network 103 may include a cellular network. Network 106 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, Zig-Bee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security An example embodiment of service provider terminal 110 is shown in more detail in FIG. 2. Sender computing device 120 and recipient computing device 130 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, service provider terminal 110 may further include a peripheral interface, a transceiver, a mobile network interface in communication with processor 210, a bus configured to facilitate communication between the various components of the service provider terminal 110, and a power source configured to power one or more components of service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider terminal 110 may configured to remotely communicate with one or more other devices, such as sender computing device 120 and recipient computing device. According to some embodiments, service provider terminal 110 may utilize a dual-stage neural network pipeline to detect and recognize textual information.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from service provider terminal 110. For example, service provider terminal 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable service provider terminal 110 to perform one or more of the processes and functionalities associated with the disclosed embodiments.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may include one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via sender computing device 120 and recipient computing device 130).

In example embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

In some cases, the service provider terminal 110 may be embodied in a single device (e.g., a server). In other cases, a plurality of devices may work to provide the functionality of the describes service provider terminal 110.

Figure 3:
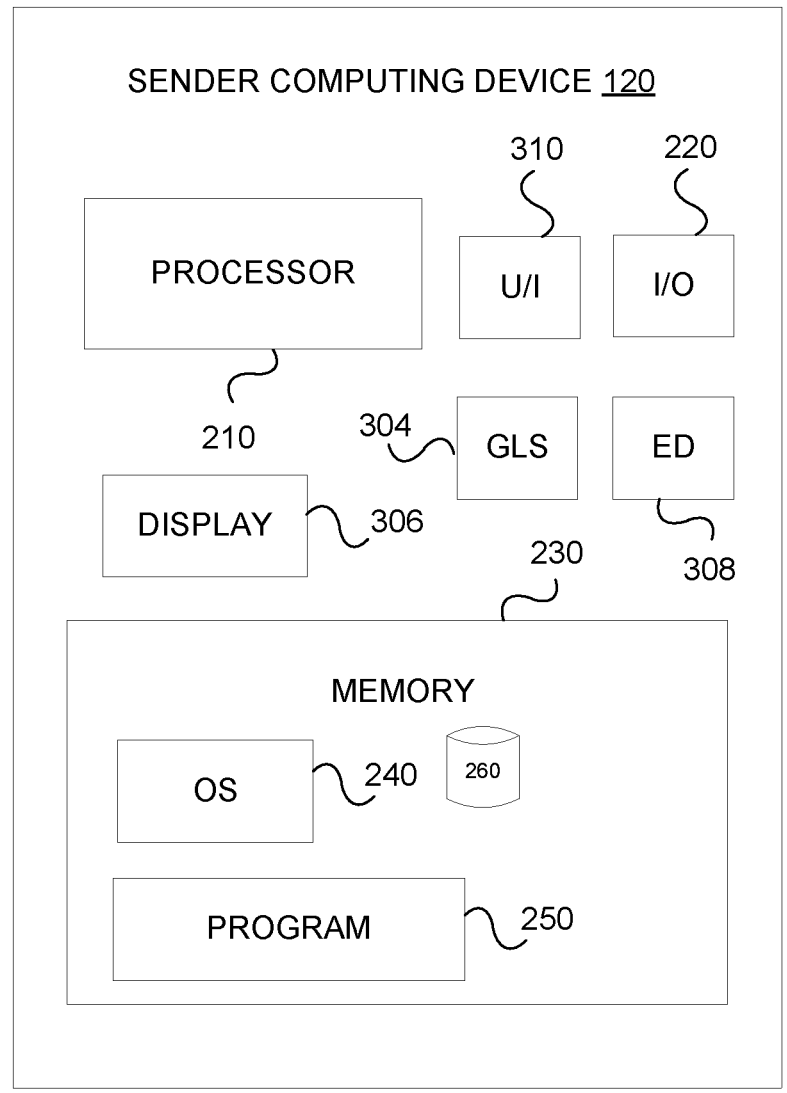
FIG. 3 is a component diagram of a sender computing device according to an example embodiment.

FIG. 3 shows an example embodiment of a sender computing device 120. As shown, sender computing device 120 may include input/output ("I/O") device 220 for receiving data from another device (e.g., service provider terminal 110), memory 230 containing operating system ("OS") 240, program 250, and any other associated component as described above with respect to service provider terminal 110. Sender computing device 120 may also have one or more processors 210, a geographic location sensor ("GLS")

304 for determining the geographic location of sender computing device 120, a display 306 for displaying content such as text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

Components of recipient computing device 130 may be substantially similar to those describes with respect to sender computing device 120. Accordingly, a detailed description is not repeated for compactness.

Figure 4:
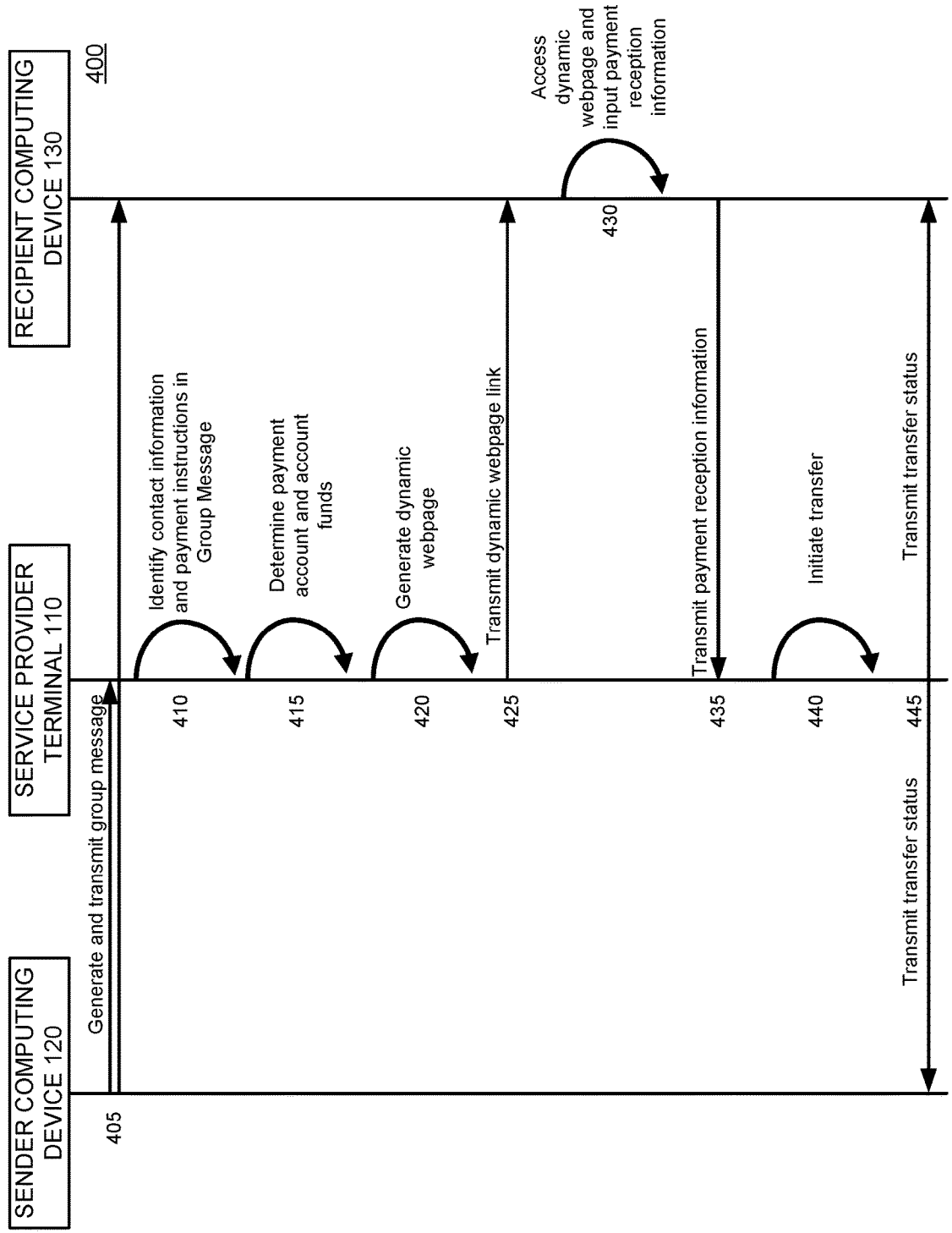
FIG. 4 is a timing diagram of a funds transfer method using group text according to an example embodiment.
Figure 5:
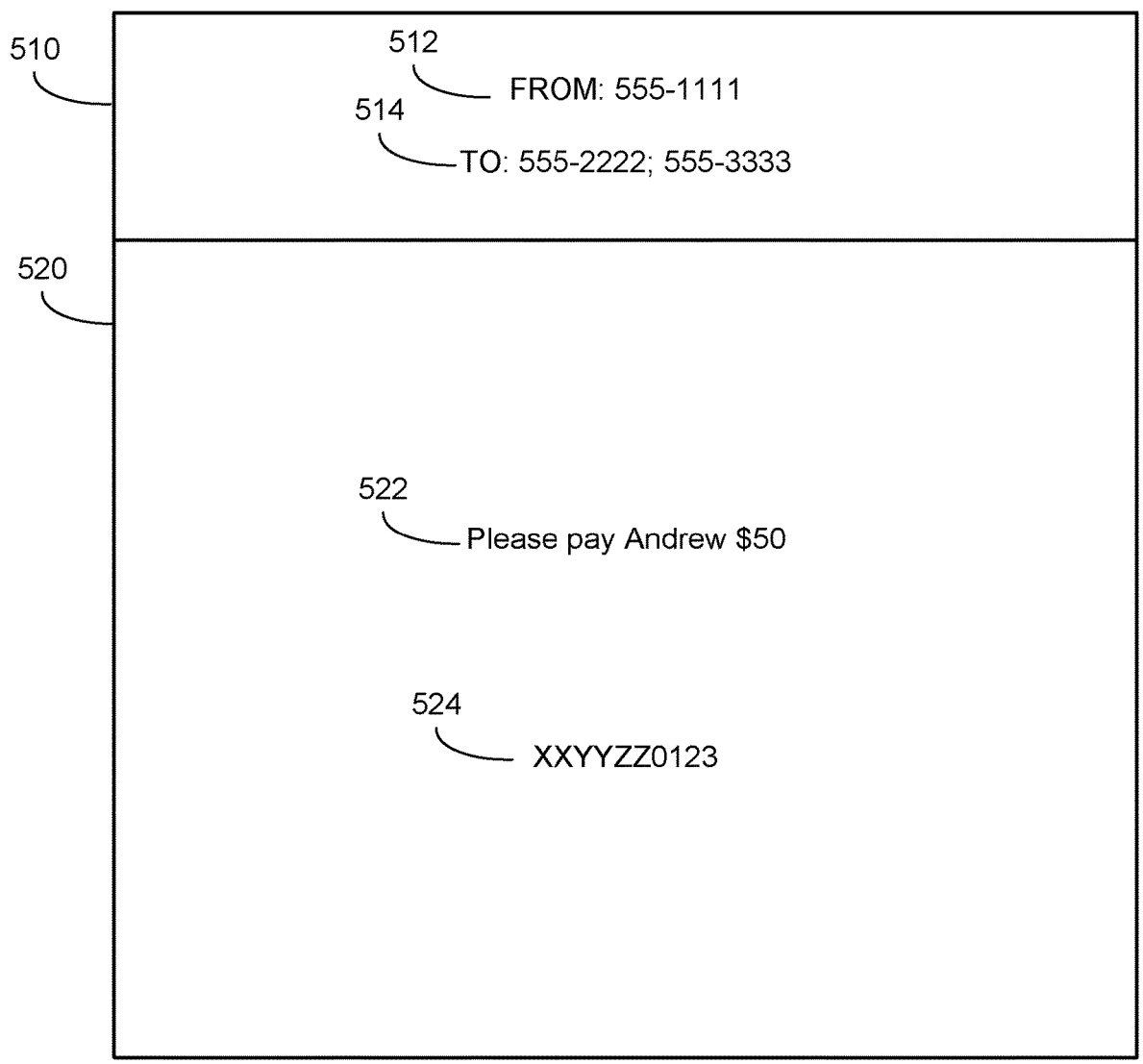
FIG. 5 is an example group text structure according to an example embodiment.

FIG. 4 shows a timing diagram 400 of a fund transfer according to an example embodiment. At 405, the sender computing device 120 generates and transmits a group message to the service provider terminal 110. In some cases, the sender computing device 120 may execute an application and generate the group message in accordance with commands from the application. A method of generating the group message is described in more detail below with reference to FIG. 6. The group message may be sent using a text messaging protocol. FIG. 5 illustrates a structure of the group message according to an example embodiment. The group message 500 includes a header 510 and a body 520. The header includes contact information from the sender 512 (i.e., a telephone number associated with the sender computing device 120) and the recipients 514, 516 (i.e., telephone numbers associated with service provider terminal 110 and the recipient computing device 130). The body 520 of the text message includes payment instructions 522 for the service provider terminal 110 to provide a payment to a user of the recipient computing device 130. In some embodiments, the body 520 may include a verification code 524 for verifying an authenticity of the payment instructions 522. As non-limiting examples, the verification code 524 may be a hash value created based on one or more of a time of submission, a transfer amount, sender contact information 512, recipient contact information 516, and an account associated with the sender contact information 512.

Referring back to FIG. 4, at 410, the service provider terminal 110 parses the group message to identify contact information of the sender 512 and recipient 516, and the payment instructions 522. If included, the service provider terminal 110 may also identify the verification code 524 and verify the authenticity of the payment instructions 522. At 415, the service provider terminal 110 determines, based on the sender contact information, an account associated with a user of the sender computing device 120, and accesses the account to determine if there are sufficient funds to fulfill the payment instructions 522.

At 420, if the account has sufficient funds, the service provider terminal 110 generates a dynamic web page. In some embodiments, the dynamic web page is uniquely linked or associated with the payment request. The dynamic web page may have input fields for receiving payment reception information (e.g., recipient account information or recipient address information). In some cases, the dynamic web page may be accessible for a limited time (e.g., 24 hours) before the web page is deleted or deactivated. At 425, the service provider terminal 110 transmits a link to the dynamic web page to the recipient computing device 130. The link may be sent using a private message, for example, using a text message protocol with the recipient computing device 130 as the only recipient.

At 430, the recipient computing device 130 receives an indication to follow the link to the dynamic web page, for example, from user input. At 435, payment reception information is transmitted to the service provider terminal 110 from the recipient computing device 130 using the dynamic web page. At 440, the service provider terminal 110 initiates a transfer from the account associated with the user of the sender computing device 120 to a user of the recipient computing device 130 in accordance with the payment instructions 522. At 445, the service provider terminal 110 notifies the sender computing device 120 and the recipient computing device 130 of the payment initiation.

Figure 6:
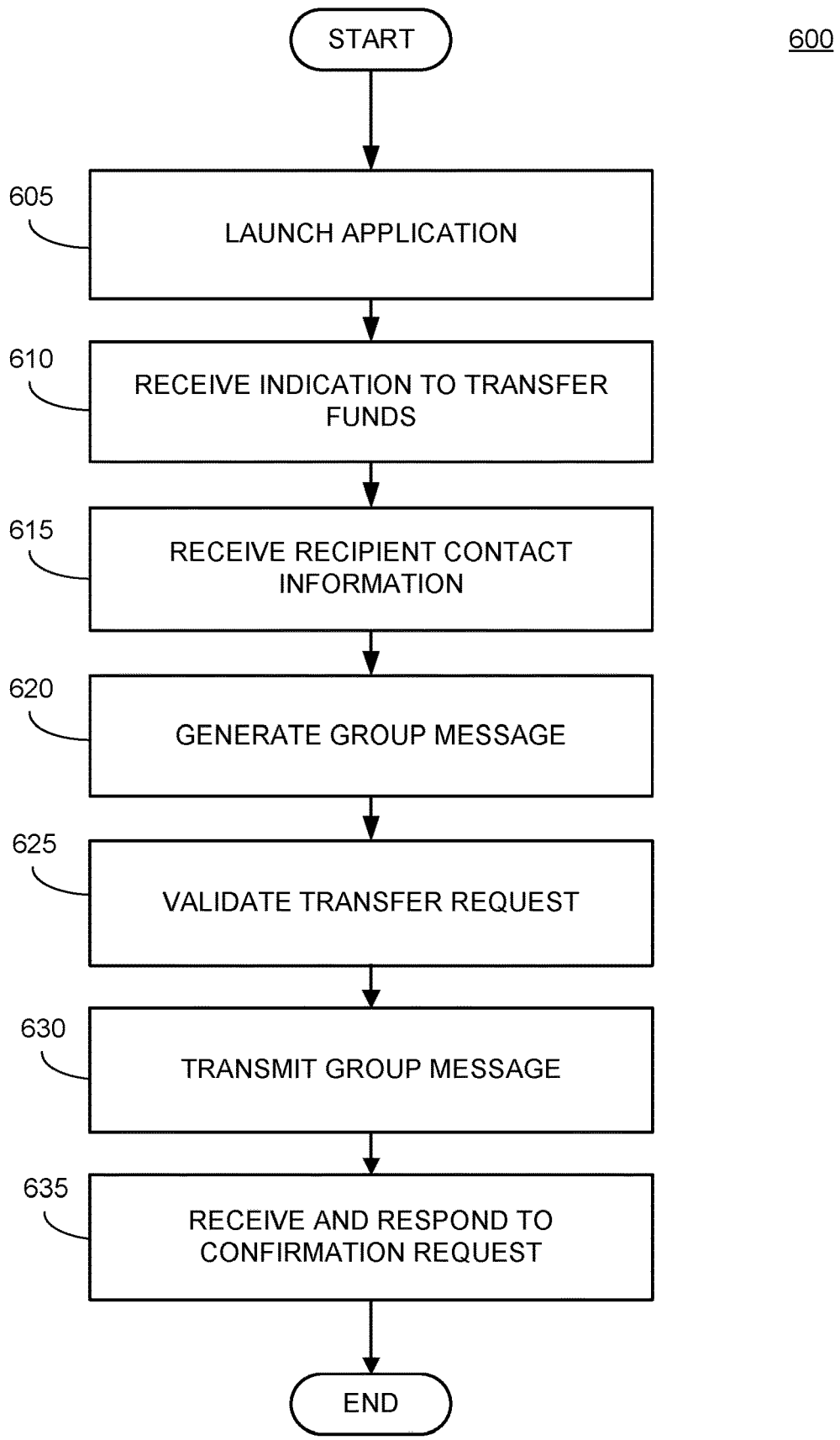
FIG. 6 is a flowchart of generating a group message in accordance with an example embodiment.

FIG. 6 illustrates a method 600 of generating a group message in accordance with an example embodiment. The method 600 may be performed by the sender computing device 120. At 605, the sender computing device 120 executes or launches an application. The application may include functionalities to generate a funds transfer request. In some cases, the application may verify an identity of the user of the sender computing device 120, for example, by requiring log-in credentials. In some embodiments, the application may be associated with a financial institution and/or the service provider terminal 110. At 610, the sender computing device 120 receives an indication for a request to transfer funds. The indication may be input into the application. In some cases, the application may present a graphical user interface configured to receive user input designated for initiating fund transfers.

At 615, the sender computing device 120 receives contact information for a recipient computing device 130 and fund transfer parameters (e.g., how much, when, where, form of payment, etc.). The contact information may be received by user input. In some cases, the application may access contact information of a user of the sender computing device 120. For example, the sender computing device 120 may access and display a list contacts stored on the sender computing device 120, receive an indication of a selection of a contact from the list of contacts, and extract contact information of the selected contact (i.e., the recipient computing device 130).

At 620, based on this information, the sender computing device 120 generates the group message according to a text messaging protocol. The group message may be directed to the service provider terminal 110 and the recipient computing device 130. The group message 500 may instruct the service provider terminal 110 to transfer funds to a user of the recipient computing device 130 in accordance with the payment instructions 522 included in the group message 500.

In some cases, at 625, the sender computing device 120 performs transfer request validation. For example, in some embodiments, the sender computing device 120 (i.e., the application executing on the sender computing device 120) generates a verification code 524 and inserts the verification code 524 into the body 520 for the group message 500. The verification code 524 may be a hash value calculated based on, as non-limiting examples, account information associated with a user of the sender computing device 120, contact information associated with the sender computing device 120 or the recipient computing device 130, log-in credentials to the application, a transfer amount, and a value provided by the application. The verification code 524 may be pseudo-randomly generated by the sender computing device 120 (e.g., by the application).

In some implementations, the sender computing device 120 may establish a connection with the service provider terminal 110 and transmit a verification message to the service provider terminal 110 over the connection. In some cases, the verification message may merely indicate that a transfer is being requested from the user of the sender computing device. In some embodiments, the verification message may include the verification code 524.

At 630, the group message 500 is transmitted to the recipient computing device 130 and the service provider terminal 110. In some cases, the group message 500 may be generated and displayed before transmitting the group message 500. In other implementations, the group message 500 may be automatically generated and transmitted in response to receiving the contact information for the recipient computing device.

In some cases, at 635, the sender computing device 120 may receive and respond to a confirmation request from the service provider terminal 110. As a non-limiting example, the service provider terminal 110 may attempt to interpret an intent to the payment instructions 522, and provide the interpretation to the service provider terminal 110 for verification. The service provider terminal 110 may transmit a confirmation message or an objection message based on a review of the interpretation.

Although the group message 500 is discussed as being sent to a singular recipient computing device 130, this is merely an example. In some cases, the group message 500 may be directed to a plurality of recipient computing devices 130 and the service provider terminal 110. The group message 500 may include individual payment instructions 522 for each of the recipient computing devices 130 or group payment instructions (not shown). The service provider terminal 110 is configured to interpret the payment instructions 522 for one or more recipient computing devices 130. Example payment instructions are described below with reference to Table 1.

identifies the sender. For example, the service provider terminal 110 may parse the group message to determine a phone number of the sender (e.g., the sender computing device 120) and identify the sender by comparing the phone number of the sender to records maintained by the service provider terminal 110. In some cases, the service provider terminal 110 may be associated with a financial service provider (e.g., a bank), and a user of the sender computing device 120 may be a customer of the financial service provider.

In some cases, the service provider terminal 110 may identify the sender based on information included within the group message 500. For example, the service provider terminal 110 may parse the group message to locate encoded information indicating one or more of the sender (e.g., the sender computing device 120) or the sender account. The encoded information may be generated by, for example, an application that generates the group message on the sender computing device 120. In some cases, the application may be an application associated with the financial service provider, and require a user log-in before generating the group message with the encoded information. In some cases, the encoded information may be a hash value based on one or more of the sender and the sender account.

At 715, the service provider terminal 110 identifies a payment account associated with the sender (i.e., the sender computing device 120). For example, the payment account may be a savings account, a checking account, or a credit card account. In some cases, the service provider terminal 110 may associated with a financial service provider (e.g., a bank), and the payment account may be an account at the financial service provider. At 720, the service provider terminal 110 parses the group message to identify contact information for the recipient (i.e., the recipient computing device 130). For example, group message 500 may include a header information indicating that the group message 500 was directed to one or more entities other than the service provider terminal 110. For example, the service provider terminal 110 may parse the group message to determine a

TABLE 1

| Payment Instruction | Message Recipients | Interpretation |
|---|---|---|
| Please pay Andrew $50 | Andrew<br>Service Provider Terminal | Transfer $50 from Sender to Andrew |
| Please pay Andrew and Stephen each $50 | Andrew<br>Stephen<br>Service Provider Terminal | Transfer $50 from Sender to Andrew<br>Transfer $50 from Sender to Stephen |
| Please split $50 between Andrew and Stephen | Andrew<br>Stephen<br>Service Provider Terminal | Transfer $25 from Sender to Andrew<br>Transfer $25 from Sender to Stephen |
| Please pay Andrew $50 and Stephen $25 | Andrew<br>Stephen<br>Service Provider Terminal | Transfer $50 from Sender to Andrew<br>Transfer $25 from Sender to Stephen |
| Please pay Andrew my ⅓ of $90 | Andrew<br>Service Provider Terminal | Transfer $30 from Sender to Andrew |

Figure 7:
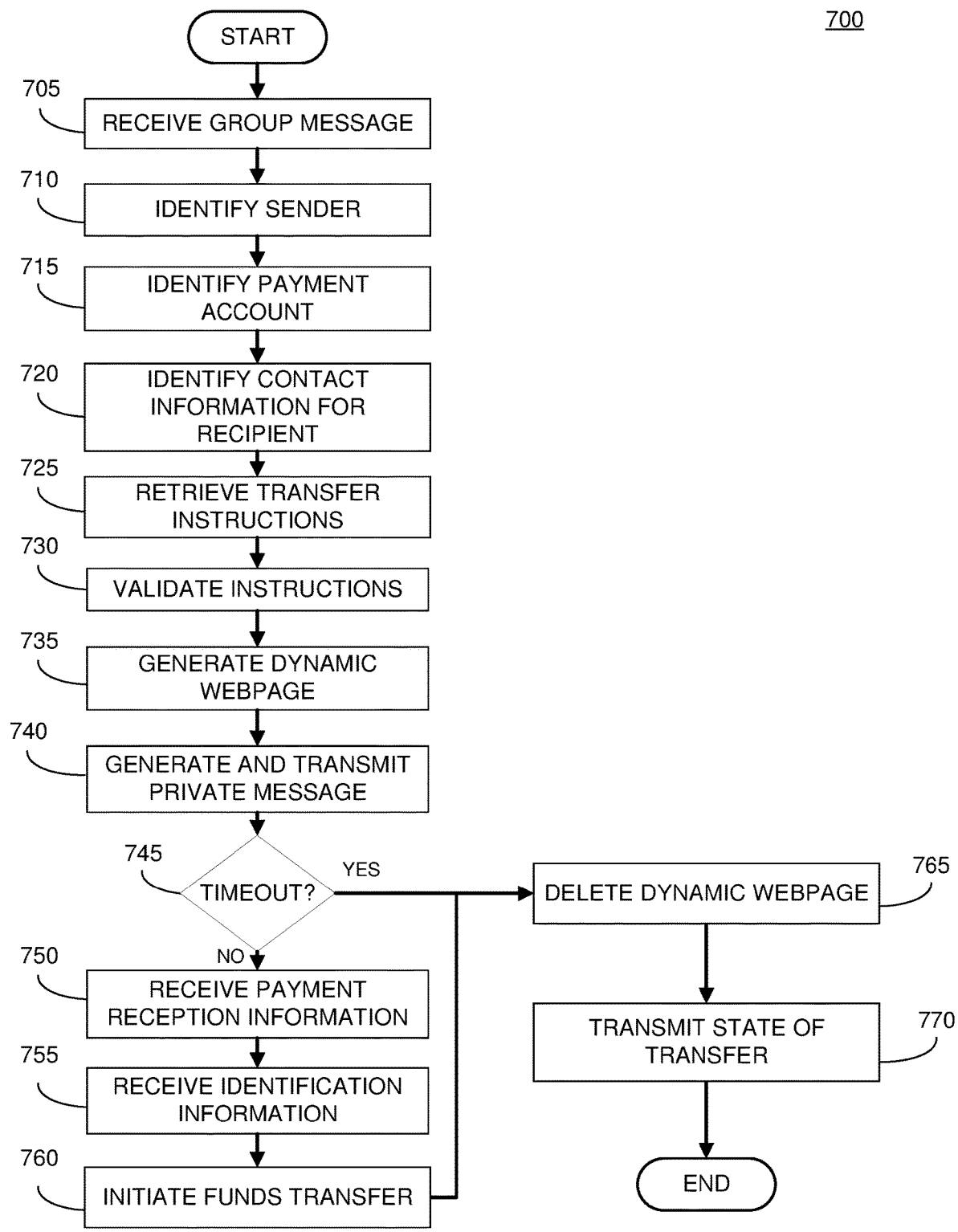
FIG. 7 is a flowchart of initiating a funds transfer in accordance with an example embodiment.

FIG. 7 illustrates a method 700 of initiating a funds transfer in accordance with an example embodiment. The method 700 may be performed by the service provider terminal 110 (e.g., a transfer facilitator). At 705, the service provider terminal 110 receives a group message (e.g., group message 500) sent to the service provider terminal 110 and a recipient computing device 130 from the sender computing device 120. At 710, the service provider terminal 110 phone number of the intended recipient (e.g., a user of the recipient computing device 120).

At 725, the service provider terminal 110 parses the message to retrieve instructions for a transfer request. As discussed above, the instructions may direct the service provider terminal 110 to initiate a transfer from the sender (i.e., a user of the sender computing device 120) to the recipient (i.e., a recipient computing device 130).

At 730, the service provider terminal 110 may validate the instructions. For example, the service provider terminal 110 may receive a validation message from the sender computing device 120 in addition to the group message 500. The validation message may be sent over a secure connection formed between the sender computing device 120 and a server of a financial institution associated with the service provider terminal 110. For example, the sender computing device 120 may execute an application requiring log-in credentials. The application may automatically transmit a validation message when a group message 500 is generated by the sender computing device 120. In some embodiments, a validation code may be included in the group message 500. For example, the validation code may be generated by the sender computing device 120 and/or received by the sender computing device 120 from the financial institution associated with the service provider terminal 110. As discussed above, in some cases, the validation code may be a hash value of one or more aspects associated with the request. The service provider terminal 110 may parse the group message 500 to identify the validation code and verify the code, for example, by comparing the code to a stored or calculated value.

At 735, the service provider terminal 110 may generate a dynamic webpage with fields for receiving payment reception information or request the dynamic web page to be generated. The dynamic webpage may have a randomized URL. The dynamic web page and/or URL may be uniquely associated with the transfer request, such as via association with a unique identifier or the validation code. In some cases, the dynamic web page may require log-in credentials. In some implementations, the dynamic webpage may only be accessible from certain locations (e.g., GPS locations of the recipient computing device 130).

At 740, the service provider terminal 110 generates a private message and contacts the recipient (e.g., the recipient computing device 130) using the private message according to the parsed contact information of the intended recipient. For example, the service provider terminal 110 may output the private message using a text message protocol to the identified phone number of the intended recipient. The private message contains instructions for receiving a payment from the sender. For example, the private message may include a link to the generated dynamic webpage. As necessary, the private message may include log-in credentials.

At 745, the service provider terminal 110 may determine whether a timeout has occurred. At 765, if the timeout has occurred, the dynamic webpage is deleted. As a non-limiting example, the dynamic webpage may only be available for 12 hours. After 12 hours, the dynamic webpage will be deleted.

At 750 the service provider terminal 110 receives payment reception information from the recipient according to the instructions in the private message. In some cases, the recipient navigates to the dynamic webpage using the recipient computing device 130 and enters payment information into the dedicated fields. As non-limiting examples, the recipient may request a check be delivered to a particular address, a funds transfer into a specific account, the funds added to a prepaid card, or the funds be received through one or more third-party payment mechanisms (e.g., Zelle, PayPal, or Venmo) or platforms. In certain instances, the one or more third-party payment mechanisms may be presented in the webpage and limited to third-party payment mechanisms with which the sender has an account. In some cases, the one or more third-party payment mechanisms may be limited to third-party payment mechanisms with which the sender and the receive both have an account. In some instances, the service provider terminal 110 may receive the payment reception information in the form of a picture of a check. For example, the recipient may upload a picture of a check to the dynamic webpage, and the service provider terminal 110 may extract one or more of the account number, account holder, and routing information from the check image. In other embodiments, the service provider terminal 110 may receive the payment reception information in the form of a picture of a payment card or other means from which account information can be determined. In some embodiments, the dynamic webpage may be configured with functionality to activate a camera of the recipient computing device 130 to automatically capture and upload an image from which payment reception information can be determined.

At 755, the service provider terminal 110 may receive identification information of the recipient. For example, the recipient may upload an image of an identification (e.g., driver's ID or passport) that may confirm the identity of the recipient as the intended recipient.

At 760, the service provider terminal 110 initiates a funds transfer from the sender to the recipient in accordance with the instructions in the group message 500, the identified payment account associated with the sender and the received payment reception information from the recipient. The transfer of funds may be initiated via one or more transfer mechanisms determined based on the payment reception information, which in some instances may identify a particular mechanism (e.g., debit transfer, intrabank transfer, mailed check) or service (which may include a third-party service) for handling payments and fund transfers.

At 765, after receiving the payment reception information and/or the timeout occurring, the dynamic webpage is deleted. At 770, the service provider terminal 110 may transmit a message indicating the state of the funds transfer. For example, if a timeout occurs before receiving the payment reception information, the service provider terminal 110 may contact the sender computing device 120 and the recipient computing device 130 to indicate that the funds transfer did not occur. If the funds transfer is initiated, the service provider terminal 110 may contact the sender computing device 120 and the recipient computing device 130 to indicate that the funds transfer has been initiated.

In some cases, as discussed above, the group message may be directed a plurality of intended recipients. The service provider terminal 110 may identify contact information for each of the plurality of recipients, determine payment instructions for each of the plurality of recipients, generate, and contact each recipient using a respective private message between the service provider terminal 110 and each recipient computing devices 130. Individual dynamic webpages may be generated for each of the plurality of recipients to receive respective payment reception information. The body of the message may include names and values related to respective recipients. The service provider terminal 110 may match the names to the respective recipient contact information from the header. For example, if the payment instructions state "Please pay Andrew $50 and Stephen $25," the service provider terminal 110 may check its records to determine if the contact information for either recipient matches its records for an "Andrew" or a "Stephen."

According to some implementations, the service provider terminal 110 may request clarification of the payment instructions. For example, if the group message is to a plurality of recipients for different values, the service provider terminal 110 may transmit a request to the sender computing device 120 to identify which contact information corresponds to which recipient.

In some cases, the service provider terminal 110 may implement a conversational bot. The conversational bot may parse and interpret the group message 500, and prepare the private message, the notification messages, and the clarification requests.

In some cases, the service provider terminal 110 may facilitate payment transfers using on one or more third party mechanisms (e.g., Zelle, Venmo, or PayPal). For example, the sender and recipient may each have one or more accounts with a third-party payment mechanism. The service provider terminal 110 may identify a third-party payment mechanism with which both the sender and receiver have an account, the service provider terminal 110 may generate a private message (and contact the recipient using the private message) that inquires whether the recipient would like to receive payment using the identified third-party payment mechanism. In some cases, the service provider terminal 110 may only identify one or more third-party payment mechanisms with which the sender has an account, and the service provider terminal 110 may generate a private message (and contact the recipient using the private message) that inquires whether the recipient would like to receive payment using the identified one or more third-party payment mechanisms. In some instances, the private message may include the instructions for receiving a payment from the sender, with, for example, a link to the generated dynamic webpage discussed above with reference to FIG. 7 along with the inquiry about the identified third-party payment mechanism. In some cases, the inquiry may include a link to an application associated with the identified third-party payment mechanism. In a case where the group message is directed to a plurality of recipients, the service provider terminal 110 may customize third-party payment mechanism options for each recipient based on third-party mechanisms with which both the sender and the individual recipient have an account. Accordingly, in some cases, each recipient may receive funds via an available mechanism (including a third-party mechanism) that they are most interested in.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology. One of ordinary skill will understand that the order of certain elements of the block diagrams and flow diagrams may be altered unless explicitly required to operate in a particular order.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASES

The following example use cases describe examples of a typical implementation of the use of group text messages for funds transfer. These are intended solely for explanatory purposes and not in limitation. In one case, a user activates a bank application and indicates that he would like to transfer money to a third party using a group text using a smart phone (e.g., sender computing device 120). The smart phone, executing the application, may get contact information for the third party and payment instructions (e.g., how much, what time frame, from what account). The smart phone may generate and transmit a group text message to a transfer facilitator (e.g., service provider terminal 110) and the third-party (e.g., recipient computing device 130). In some cases, the smart phone may also receive and/or generate validation information and send the same to the transfer facilitator. The transfer facilitator determines a payment account associated with the user (e.g., a bank account held by the bank) and separately contacts the third-party to determine how they would like to be paid (e.g., account transfer, mailed check). The transfer facilitator initiates the transfer from the payment account in the manner identified by the third-party and in accordance with the payment instructions in the group text message.

In another case, a financial institution server (e.g., server provider terminal 110) receives a group text message from a phone (e.g., sender computing device 120) directed to it and a third party (e.g., recipient computing device 130). The financial institution server determines who sent the text, a payment account associated with the sender, and payment instructions in the group text. The financial institution server also determines contact information for the third-party and requests payment reception information (i.e., how the third-party wants to receive the funds) from the third-party. The financial institution server may generate a dynamic webpage for receiving the information and transmit the link to the third-party. Once the information is received, the financial institution server initiates the transfer from the payment account to the third-party.

What is claimed is:

1. A method of facilitating a transfer comprising:
receiving, from a telephone number of a sender, a group message directed toward a telephone number of a transfer facilitator and a telephone number of at least one targeted transfer recipient, the group message being generated by an application on a sender computing device associated with the sender and being sent according to a text-messaging protocol, the group message comprising a verification code for verifying an authenticity of a transfer request, wherein the verification code is pseudo-randomly generated by the application on the sender computing device and is provided in a body of the group message;
generating, in response to receiving the group message, a dynamic webpage with fields for receiving payment reception information, wherein the payment reception information comprises at least one of recipient account information and recipient address information;
identifying, based on the telephone number of the sender, the sender and the payment account associated with the sender;

parsing the group message to identify the telephone number of the at least one targeted transfer recipient and instructions for the transfer request;

contacting, using a private message sent to the telephone number of the at least one targeted transfer recipient according to the text-messaging protocol, the at least one targeted transfer recipient with instructions for receiving a payment from the sender, wherein the private message contains a link to the dynamic webpage;

receiving, from a recipient device of the at least one targeted transfer recipient via the dynamic webpage without requiring a user of the recipient device to authenticate, the payment reception information including at least one of a recipient account or a payment method; and initiating, in accordance with the instructions for the transfer request, a fund transfer from the sender to the at least one targeted transfer recipient from the payment account associated with the sender and based on the payment reception information; and deleting the dynamic webpage in response to either receiving the payment reception information or a timeout occurring.

2. The method of claim 1, further comprising:
receiving, from the at least one targeted transfer recipient, image data of an image of an identification of the at least one targeted transfer recipient; and
analyzing the image data to confirm an identify of the at least one targeted transfer recipient.

3. The method of claim 1, wherein receiving payment reception information comprises:
receiving, from the at least one targeted transfer recipient, image data of an image of a check; and
extracting account information from the image data as the payment reception information.

4. The method of claim 1, wherein
the method further comprises transmitting a confirmation to the transfer facilitator responsive to receiving a communication seeking confirmation of an interpretation of the transfer request.

5. The method of claim 4, wherein
a header of the group message includes contact information for each of the at least one targeted transfer recipient and the body of the group message includes names associated with respective transfer amounts corresponding to each of the at least one targeted transfer recipient; and
the method further comprises matching the names to the contact information.

6. The method of claim 1, wherein the fund transfer occurs without any further action from the sender.

7. The method of claim 1, wherein the verification code comprises a hash value determined as a result of an input of at least one element of a transfer amount, a sender account information, at least one recipient contact information, or a payment account associated with the sender and verifying the authenticity of the instructions for the transfer request further comprises comparing the verification code to a stored code or a calculated code prior to initiating the fund transfer from the sender to the at least one targeted transfer recipient.

8. A system comprising:
one or more processors; and
a memory in communication with the one or more processors and storing instructions that, when executed by the one or more processors, are configured to cause the system to:

implement a conversational bot for facilitating transfer requests;

receive, from a telephone number of a sender, a group telephony message addressed to a telephone number associated with the conversational bot and a recipient telephone number associated with a recipient, the group telephony message being generated by an application on a sender computing device associated with the sender and comprising a funds transfer request from the sender to the recipient and a verification code for verifying an authenticity of a transfer request, wherein the verification code is pseudo-randomly generated by the application on the sender computing device and is provided in a body of the group telephony message;

generate, responsive to receiving the group telephony message, a dynamic webpage with fields for receiving payment reception information, wherein the payment reception information comprises at least one of recipient account information and recipient address information;

parse the group telephony message to identify the telephone number associated with the recipient and instructions for the transfer request;

output, to the recipient based on the telephone number associated with the recipient, a payment recovery message requesting information on delivering payment to the recipient, a body of the payment recovery message being determined by the conversational bot, the payment recovery message comprising a link to the dynamic webpage;

receive, from the recipient, the payment reception information via the dynamic webpage without requiring the recipient to authenticate;

initiate, in accordance with the funds transfer request, a funds transfer from the sender to the recipient based on the payment reception information;

identify, from the group telephony message, the telephone number of the sender;

determine an identity of the sender based on the telephone number of the sender, wherein the sender has a personal account associated with the system, and the recipient does not have a personal account associated with the system; and delete the dynamic webpage in response to either receiving the payment reception information or a timeout occurring.

9. The system of claim 8, wherein
the group telephony message is directed towards the telephone number associated with the conversational bot and a plurality of respective telephone numbers associated with a plurality of recipients,
the body of the group telephony message comprises the funds transfer request to transfer respective specified amounts to each of the recipients, and
the instructions are further configured to cause the system to analyze, using the conversational bot, the body of the group telephony message to determine an amount of money to be transferred to the respective recipients.

10. The system of claim 8, wherein the instructions are further configured to cause the system to:
determine a payment account associated with the sender for transferring funds to the recipient in accordance with the funds transfer request.

11. A method of facilitating a transfer comprising:
receiving, at a transfer facilitator, a group message configured to initiate a funds transfer, the group message being generated by an application on a sender computing device and sent using a text-messaging protocol and comprising a verification code in a body of the group message, wherein the verification code is pseudo-randomly generated by the application on the sender computing device;

parsing the group message to identify transaction data comprising a telephone number of a sender of the group message, a telephone number of a recipient of the funds transfer, the verification code, and an amount of the funds transfer;

identifying, based on the telephone number of the sender, a sender name and a payment account associated with the sender;

verifying an authenticity of instructions for the transfer request based on the verification code;

generating a customized dynamic webpage with an input indicating the recipient accepts the funds transfer, wherein the dynamic webpage includes fields for receiving at least one of a payment account associated with the recipient and recipient address information;

sending a private message to the telephone number of the recipient using the text-messaging protocol, the private message including instructions for receiving the funds transfer from the sender and a link to the dynamic webpage;

receiving, from the dynamic webpage without requiring the recipient to authenticate, recipient information including: a name of the recipient, the payment account associated with the recipient, and the input accepting the funds transfer; and initiating the funds transfer from the sender to the recipient from the payment account associated with the sender to the payment account associated with the recipient; and deleting the dynamic webpage in response to either receiving the recipient information or a timeout occurring.

12. The method of claim 11, further comprising:
sending a supplemental private message to the recipient comprising log-in credentials to provide access to the customized dynamic webpage.

13. The method of claim 12, further comprising:
receiving login credentials from the recipient;
determining that the login credentials from the recipient match the login credentials sent to the recipient; and
providing access to the dynamic webpage to the recipient.

14. The method of claim 11, further comprising:
receiving global positioning data from a recipient device associated with the telephone number of the recipient.

15. The method of claim 14, further comprising:
confirming that the customized dynamic webpage is accessible based on the global positioning data received from the recipient device.

16. The method of claim 11, wherein the dynamic webpage is further configured to activate a camera associated with a recipient computing device to automatically capture and upload an image from which the payment account for the recipient is determined.

17. The method of claim 1, wherein the verification code is pseudo-randomly generated by the application on the sender computing device associated with the sender based on one or more of a time of submission, a transfer amount, sender contact information, recipient contact information and an account associated with the sender contact information and the verification code.

18. The method of claim 1, wherein recipient account information of the dynamic webpage comprises one or more third party payment mechanisms with which the sender has an account.

19. The method of claim 1, wherein the dynamic webpage comprises a webpage that is uniquely associated with the verification code.

20. The method of claim 1, wherein access to the dynamic webpage by the recipient device is restricted to one or more specified locations and the recipient device's ability to access the dynamic webpage depends on location data provided by the recipient device.

* * * * *